United States Patent [19]

Sapitowicz et al.

[11] Patent Number: 4,626,672
[45] Date of Patent: Dec. 2, 1986

[54] DOCUMENT PROCESSING APPARATUS

[75] Inventors: Thomas P. Sapitowicz, Bel Air; Mark T. MacLean-Blevins, Forest Hill, both of Md.

[73] Assignee: General Instrument Corporation, New York, N.Y.

[21] Appl. No.: 576,536

[22] Filed: Feb. 3, 1984

[51] Int. Cl.⁴ .............................................. G06K 13/08
[52] U.S. Cl. .................................... 235/480; 235/475; 271/225; 355/14 SH
[58] Field of Search ............... 235/475, 480, 481, 384; 271/225; 355/14 SH

[56] References Cited

U.S. PATENT DOCUMENTS

| | | | |
|---|---|---|---|
| 3,227,444 | 1/1966 | Egan | 235/480 X |
| 3,501,622 | 3/1970 | Weir et al. | 235/384 |
| 3,836,753 | 9/1974 | Pass | 235/475 X |
| 4,545,668 | 10/1985 | Zaitsu | 355/14 SH |

Primary Examiner—David L. Trafton
Attorney, Agent, or Firm—James & Franklin

[57] ABSTRACT

A bar coded or user marked document is moved along a first transport path, where it is read. A portion of the document is situated in a curved retaining section. If validated, the document is moved completely into the retaining section and then into a second transport path, past a head for imprinting bar codes and text, to an output hopper. If invalid, the document is returned along a portion of the first transport path, along a reject transport path, to a hopper designated for this purpose. Blank documents may be fed from an internal stack into the second transport path for printing and then to an output hopper. First, second, and third frame sections define the first and second transport paths and are pivotally interconnected. Correspondingly curved portions of the first and second frame sections define the retaining section. The first frame section is mounted to the second frame section and can be pivoted relative thereto to provide access to the first path. The first and second frame sections can be pivoted as a unit relative to the third frame section to provide access to the second path.

42 Claims, 10 Drawing Figures

DOCUMENT PROCESSING APPARATUS

The present invention relates to document processing apparatus and, more particularly, to a ticket reader, validator, and printer mechanism which is highly compact and includes three movably interconnected frame sections which can be pivoted with respect to each other to provide easy access to all internal components to permit routine maintenance and, particularly, to the document transport paths to facilitate clearance of jams.

Automated wagering systems and, particularly, so-called "self-service" wagering systems which accept tickets marked by a bettor to indicate the particulars of a desired wager, are expected to be widely used at race tracks. Such on-track systems have a variety of advantages over previously used manual systems in that they greatly reduce the number of personnel required to process bets, permit the bettor to perform betting transactions without assistance from track personnel, automatically provide the bettor with a receipt acknowledging wagers, permit decentralized wagering at the track, reduce the time required for each transaction, and reduce waiting time and congestion.

In addition, off-track betting has also become prevalent in many states. Normally, off-track betting takes place in a limited number of centrally located establishments or parlors designed for this specific purpose. Each of the parlors is connected electronically to one or more race tracks and provides facilities by which bettors can receive up-to-date race information, make wagers, and cash winning tickets. Such betting establishments normally employ a number of trained personnel who accept cash from the patrons, operate ticket issuing machines, and pay winning tickets.

In addition to on-track and off-track betting facilities, many states now permit other types of gambling such as lotteries and numbers games to raise revenue. Because of the nature of these gambling operations, tickets are normally sold in a multitude of different locations throughout the state, such as in stores, at newsstands, in railroad stations, on street corners, and the like. The widespread availability of the lottery tickets or numbers game and the simplicity of the placing of a bet have significantly enhanced the popularity of these games. As a consequence, the lottery and numbers game have become competitive with off-track betting operations, although they lack the sports aspect associated with racing.

In order to compete effectively with lotteries and numbers games, it appears that it will be necessary for off-track betting operations to increase public accessibility by enhancing the ease at which wagers can be placed, as well as providing a great number of additional locations at which wagers can be placed and winning tickets cashed. It has become necessary for the off-track betting industry to change its method of operation by replacing the relatively limited number of centrally located betting parlors by a relatively large number of easily accessible and conveniently situated outlets, such as in candy stores, newspaper stands, etc.

It has, therefore, become necessary to develop a ticket reader, validator, and printer mechanism suited for this purpose. In particular, the mechanism must be highly compact because it is intended to be situated in locations where space is at a premium. The mechanism must also be able to be operated and maintained by a limited number of relatively unskilled personnel at each location. In particular, in spite of the compactness of the mechanism, it must be structured such that relatively unskilled personnel can clear jams and do routine maintenance without having to wait for skilled repair personnel. In this way, down time is reduced, thereby insuring that wagers may be placed and winning tickets cashed a high percentage of the time at each of the various locations.

In addition, although such mechanisms must be highly compact, they must be capable of performing a variety of different functions. The mechanisms must be capable of issuing tickets with both machine-readable and user-readable information representing a placed wager printed thereon. The mechanisms must be able to accept either machine-issued or user marked tickets for validation and cashing. Moreover, the mechanism must be able to accept tickets for processing both individually and in bulk and process the tickets at a relatively high speed.

It is, therefore, a prime object of the present invention to provide document processing apparatus which is highly compact and, at the same time, is capable of performing a variety of different functions.

It is another object of the present invention to provide document processing apparatus which can be operated and maintained by relatively unskilled personnel.

It is another object of the present invention to provide document processing apparatus wherein clearance of jams and routine maintenance can be easily performed.

It is another object of the present invention to provide document processing apparatus which is structured to permit easy access to the various components thereof, as well as the document transport pathways.

It is another object of the present invention to provide document processing apparatus suitable for processing documents bearing marks made thereon by the user, as well as machine printed indicia.

It is another object of the present invention to provide document processing apparatus which reads, validates, prints, and issues tickets.

In general, the above objects are achieved by mounting the various components of the apparatus on a number of different pivotally interconnected frame sections which define document transport pathways. By pivoting selected frame sections from their normal positions, access is provided to the document transport pathways, in order to clear jams, and to the various components of the apparatus, for routine maintenance purposes. This structure permits the apparatus to be highly compact and, at the same time, provides easy access to all of the necessary internal locations.

In accordance with the present invention, document processing apparatus is provided comprising input means, read means, and retaining means situated along a first transport path. First transport means are provided for transporting a document along the first path, between the input means and the retaining means. Print means and output means are arranged along a second transport path. Second transport means are provided for transporting a document along the second path, between the retaining means and the output means. The apparatus comprises first and second frame sections and means for operably connecting the first frame section and the second frame section for relative movement therebetween to provide access to the first path.

The apparatus further comprises a third frame section. Second means are provided for operably connecting the second frame section and the third frame section for relative movement therebetween to provide access to the second path.

The input means and the read means are preferably mounted on the first frame section. The output means are preferably mounted on the second frame section. The print means are preferably mounted on the third frame section.

The first frame section and the second frame section may be pivoted as a unit relative to the third frame section. Preferably, the first frame section is at least partially situated within the second frame section.

The first frame section and the second frame section define the retaining means. More particularly, the retaining means is defined between correspondingly curved portions of the first and second frame sections which are situated in spaced relation when the first and second frame sections are in their operative positions.

The first transport means is preferably bi-directionally driven. In this manner, a pre-marked ticket can be accepted at the input means, transported past the read means, and partially into the retaining means. If the read ticket is unacceptable because it contains improper user marked information or a non-winning bet represented by the bar code, the direction of the transport means can be reversed such that the ticket can be returned along a portion of the first path, through a reject transport path to a reject hopper forming a part of an output means.

Preferably, the read means and the print means are situated to operate on different sides of the document. Thus, both sides of the document can be utilized, one side to permit the user to mark the desired wager, and the other side to permit the apparatus to print both machine-readable (bar code) and user-readable (text) confirmation of an accepted wager.

The apparatus further comprises blank document dispensing means. The blank document dispensing means is situated to feed blank tickets into the second transport path. Thus, the apparatus can also issue a new document and imprint thereon both machine-readable and user-readable indicia. The blank document dispensing means is preferably a top loading magazine which is accessible from the top of the apparatus when the frames are in their operative positions. Accordingly, the dispensing means can be reloaded without cutting power to the apparatus or pivoting the frames. The blank document dispensing means is preferably mounted on the second frame section of the apparatus. Movement of the second frame means relative to the third frame means provides access to the scrub roller which removes blank documents from the bottom of the magazine.

The read means is situated to read documents as they are moved along the first transport path. The read means preferably comprises means for reading machine-printed indicia, such as a bar code or the like, and a mark sense reader means for reading markings placed on the document by the user. Thus, the apparatus of the present invention is capable of processing machine issued documents, as well as blank documents which have been marked by the user.

Means, normally situated in a first position, are adapted to be engaged by the leading edge of a document as the document is moved along the first path into the retaining means. The engaged means are moved by the document to a second position as the document is moved within the retaining means to an intermediate position. The engaged means, when in the second position, tends to urge the document in the reverse direction. Thus, a document which is partially situated in the retaining means is urged in the reverse direction by the engaging means such that it can be returned along the first path, then through the reject transport path to the reject output hopper, if it is considered unacceptable. On the other hand, if the document is acceptable, it will be moved completely into the retaining means, moving the engaging means to a third position and, thereafter, will be urged by the engaged means towards the second transport path.

The first transport means comprises means for moving a document between the read means and the retaining means, and means for controlling the actuation and direction of the moving means. The control means causes the moving means to first move the document only partially into the retaining means and, thereafter, either back along the first transport path, through the reject transport path, and to the reject output hopper, or completely into the retaining means. The engaged means tends to move the document towards the second transport path once the document is situated completely within the retaining means. Otherwise, the engaged means tends to move the document back into the first transport path.

In addition to the reject output hopper, the output means preferably comprises first and second output hoppers. Means are provided for selecting one of the first and second output hoppers. A document is guided from the second path into one of the first and second output hoppers by the selecting means. The first output hopper is utilized for documents which have been validated and are being returned to the bettor. The second output hopper is utilized for newly issued documents.

The print means is preferably situated within a module which has an internal drive motor. The module includes a bar code printer and a shuttle-type user-readable indicia (text) printer. When a document is issued or validated by the apparatus, it will contain not only machine-readable indicia evidencing the wager, but also user-readable indicia such that the bettor has a permanent receipt evidencing the wager.

The second transport means includes the motor situated in the printer module which also drives the means for selecting the appropriate output hopper. A unique system including a toothed roller, which drives the hopper selecting means and a mating roller with a soft periphery, provides a positive drive connection between the printer motor and hopper selection means.

The retaining section is designed to accept a variety of different length documents and includes a pivotally mounted cover section which permits access to the retaining section from the top of the apparatus without the necessity of pivoting the frame sections. This permits the operator to clear jams in the retaining section easily and quickly.

The transport rollers are designed to move documents through the apparatus smoothly and quickly without jamming. Many of the rollers are spring-loaded to provide positive transport action.

To these and to such other objects which may hereinafter appear, the present invention relates to a document processing apparatus, as described in detail in the following specification and recited in the annexed claims, taken together with the accompanying drawings, wherein like numerals refer to like parts and in which:

The present invention comprises input means, generally designated A, read means, generally designated B, and retaining means, generally designated C. A single document or a stack of documents, such as tickets T or the like, are placed in input means A. The tickets T are transferred, one at a time, from input means A, past read means B, and partially into retaining means C where each is temporarily stored in retaining means C. The documents are moved along a first transport path between input means A and retaining means C by a series of bi-directionally driven rollers.

Below the first transport path is a second transport path into which retaining means C feeds. Situated along the second transport path are print means, generally designated D. The second transport path feeds documents to two output hoppers which comprise a part of the output means, generally designated E. Tickets T are moved along the second transport path from retaining means C, past print means D, and into output means E by a series of driven rollers. Alternately, invalidatable tickets are moved from retaining means C, along a portion of the first transport path, through a reject transport path, and into a reject output hopper located below input means A.

The apparatus also includes blank document dispensing means, generally designated F. Means F constitutes a second feed branch to the second transport path and functions to dispense blank tickets into the second transport path, when required.

Input means A and read means B are located on a read frame section, generally designated R. Output means E and blank document dispensing means F are located on a transport frame section, generally designated Q. Print means D is located on a print frame section, generally designated P.

Portions of read frame section R and transport frame section Q define the first transport path and retaining means C. Read frame section R is pivotally mounted to transport frame section Q. Pivoting read frame section R with respect to transport frame section Q provides access to the first transport path and retaining means C.

Transport frame section Q is pivotally mounted to print frame section P. Pivoting transport frame section Q with respect to print frame section P provides access to the second transport path, printer D, and to the scrub roller which removes blank documents from dispenser F. Read frame section R and transport frame section Q can be pivoted as a unit relative to print frame section P.

Input means A comprises a ticket receiving portion 10 including spaced, substantially upstanding walls 12, between which a ticket is received. The bottom section 14 of portion 10 is downwardly slanted and is provided with a pair of outwardly extending portions 16, each having an upwardly directed portion to gravity feed the tickets toward the input scrub roller.

A pair of input rollers 18, 20 are positioned to engage a ticket situated within receiving portion 10 and move same into the first transport path. Roller 18 comprises a single, non-powered roller mounted on a shaft which is carried between a pair of spring loaded pivot arms 22. Pivot arms 22 are pivotally mounted on a shaft 24 which extends between a pair of parallel spaced plates 26, 28 which define the reader frame section R.

Below roller 18 and centrally located on a shaft 30 is a bifuricated powered scrub roller 20. Shaft 30 extends between a pair of spaced parallel plates 32, 34 which define the transport frame section Q. Shaft 30 extends beyond plate 34 and is connected to a pulley 36 through an overrunning clutch 37. Pulley 36 is driven by a motor 38 via belt 40. Motor 38 rotates a pulley 42 around which belt 40 passes. Motor 38 is mounted to a bracket 44 which is, in turn, mounted to the transport frame section Q and, more particularly, the exterior surface of plate 34 thereof.

Figure 5:
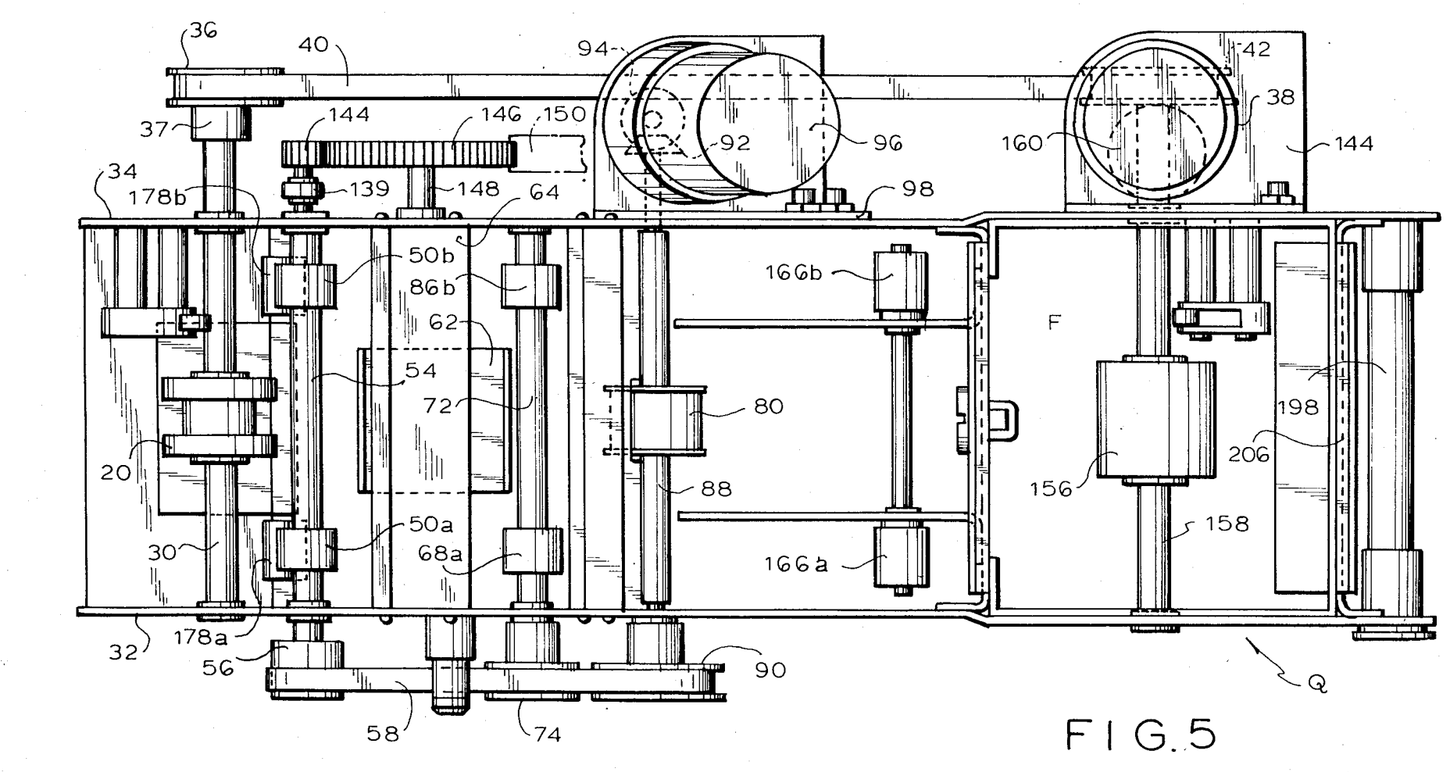
FIG. 5 is a top plan view of the transport frame section of the document processing apparatus of the present invention.
Figure 6:
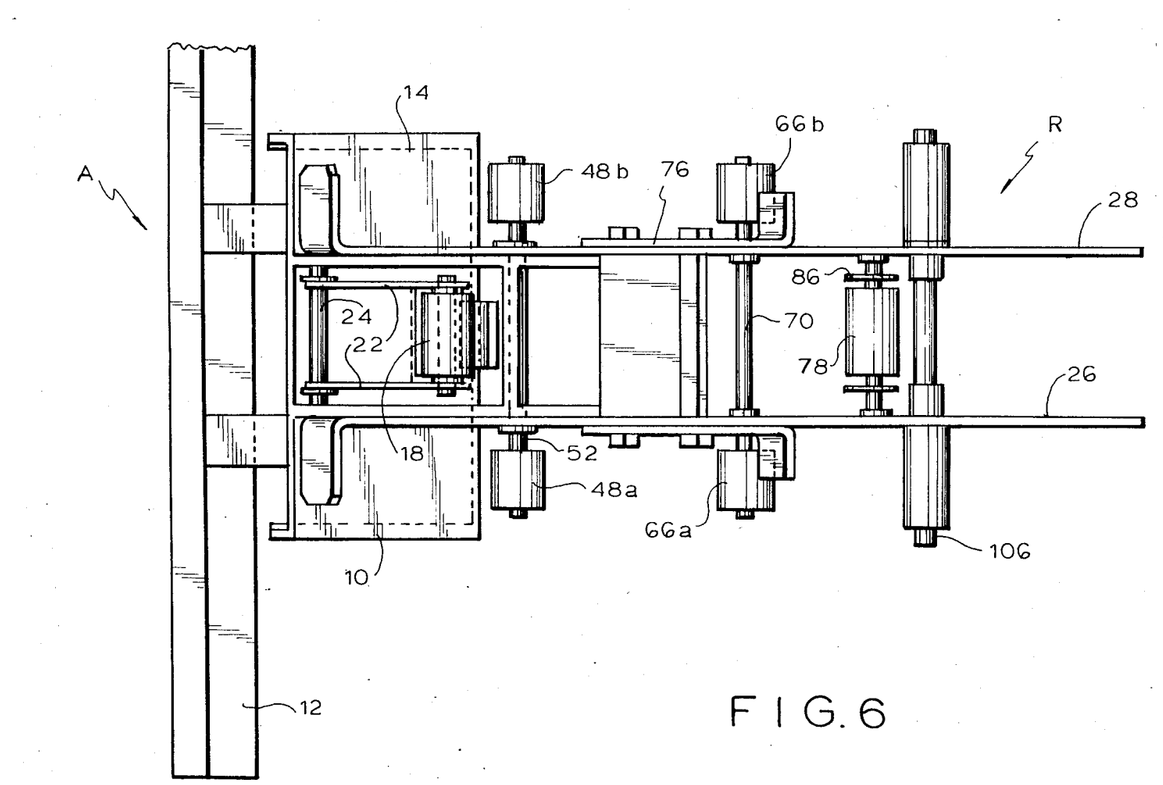
FIG. 6 is a top plan view of the reader frame section of the document processing apparatus of the present invention.

As the ticket is removed from ticket receiving portion 10 by rollers 18 and 20, it passes through a gate 46 mounted on a bracket 47, which permits only a single ticket to be removed from portion 10. As the ticket passes gate 46, the leading edge thereof is engaged by a set of roller pairs 48, 50. Each of the roller pairs 48 and 50 is made up of a spaced pair of rollers 48a, 48b and 50a, 50b (see FIGS. 5 and 6), roller 48a being aligned with roller 50a and roller 48b being aligned with roller 50b.

Non-powered rollers 48a, 48b are mounted on a downwardly spring loaded shaft 52 extending between plates 26 and 28 of the reader frame section R. Shaft 52 extends beyond the plates 26 and 28 and rollers 48a and 48b are spaced from the exterior surfaces of the plates.

Rollers 50a and 50b are mounted on a shaft 54 extending between plates 32 and 34 of the transport frame section Q. Rollers 50a and 50b are spaced from the interior surfaces of plates 32, 34, respectively. One end of shaft 54 extends beyond the exterior of plate 32. On the extended end of shaft 54 is mounted a pulley 56 which is driven by a belt 58.

As the leading edge of the ticket is received between roller pairs 48 and 50, the ticket is pulled through rollers 18 and 20 because roller pair 50 is driven at a higher speed than roller 20. The overrunning clutch 37, connected between roller 20 and motor 38, permits the ticket to be pulled through rollers 18 and 20 by permitting roller 20 to rotate faster than it is driven. This insures only a single ticket at a time can enter the first transport path.

As the ticket moves along the first transport path, it moves through a ticket sensor 60. The leading edge of the ticket engages an "L"-shaped spring element 62, connected between plates 32 and 34 by a bracket 64. The free end of spring element 62 is cammed downwardly as the ticket passes. The leading edge of the ticket is then engaged between roller pairs 66 and 68.

Roller pair 66 consists of a pair of rollers 66a and 66b which are located on the ends of a downwardly spring loaded shaft 70 extending between plates 26 and 28 of the reader frame section R. Roller pair 68 consists of a pair of powered rollers 68a and 68b, located on a shaft 72 extending between plates 32 and 34 of the transport frame section Q. One end of shaft 72 extends beyond plate 32 and carries a pulley 74 which is also driven by belt 58.

Beyond roller pairs 66 and 68 is located read means B. Read means B consists of a bar code reader mounted between plates 32 and 34 and a mark sense reader mounted between plates 26 and 28 by a bracket 76. After the ticket passes the bar code reader and the mark sense reader, the leading edge thereof passes between a pair of rollers 78, 80. Non-powered roller 78 is centrally mounted on a downwardly spring loaded shaft 82 extending between plates 26 and 28 of the reader frame section R.

Roller 80 is mounted on a shaft 88 which extends between plates 32 and 34 of the transport frame section Q. One end of shaft 88 extends beyond plate 32 and carries a pulley 90 which is engaged by belt 58. The other end of shaft 88 extends beyond plate 34 and has a bevel gear 92 mounted thereon. Bevel gear 92 engages a bevel gear 94 mounted to the output shaft of a reversable motor 96 mounted on a bracket 98. Bracket 98, in turn, is mounted to the exterior of plate 34.

Shaft 88 transfers power from one side of transport frame section Q to the other side. Thus, motor 96 drives shaft 88 through gears 92 and 94 on one side of the frame section, and shaft 88 drives pulley 90 and, thus, pulleys 56 and 74 through belt 58 on the other side of the transport frame section Q.

After the ticket passes between rollers 78 and 80, it is moved towards retaining means C. Means C is partially defined between the convex rear portions of plates 26 and 28 of the reader frame section R on the one hand, and the correspondingly shaped concave rear portions of spaced plates 32 and 34 of the transport frame section Q, and a curved cover section 100 pivotally mounted to a shaft 102 on section Q, on the other hand. Thus, retaining means C is accessible from above by pivoting cover section 100 about shaft 102.

Motor 96 will terminate the drive to rollers 50, 68, and 80 when the ticket is only partially received within retaining means C and will hold the ticket at this point, with the trailing portion of the ticket still engaged between rollers 78 and 80, until a decision is made relating to information on the ticket read by the read means B. If the user marked information indicates an acceptable wager or if the bar coded information indicates a winning bet, motor 98 will continue to drive rollers 50, 68, and 80 in the same direction such that the ticket moves completely into retaining means C.

If the user marked information is unacceptable or the bar code information shows a non-winning bet, motor 96 will reverse direction such that the ticket will be moved out of retaining means C, back past read means B. The ticket may be moved through read means B to be re-read several times, as desired. If the ticket still cannot be processed, it is then moved between rollers 66 and 68 and through a reject transport path directly to the reject output hopper of output means E.

As the leading edge of the ticket is moved into retaining means C, it will engage the free end of a pivot arm 104. The other end of pivot arm 104 is mounted to a shaft 106 mounted between plates 26 and 28 of the reader frame section R.

As the ticket moves into retaining means C, arm 104 will be pivoted counter-clockwise, as seen in the figures, until it reaches an intermediate position. Arm 104 reaches its intermediate position when the ticket is partially within retaining means C and the trailing portion thereof is still situated between rollers 78 and 80. If the ticket is to be re-read or rejected, it will be moved in the opposite direction and arm 104 will tend to urge the ticket back towards read means B.

On the other hand, if the ticket is acceptable, and the ticket is moved completely into retaining means C by the further actuation of motor 96 in the forward direction, arm 104 will then pivot to a final position, in a counter-clockwise direction, as seen in the figures, and, thereafter, tends to move the ticket towards the second transport path.

Arm 104 pushes the leading edge of the ticket until the opposite edge thereof is received between roller pairs 108 and 110 located on the printer frame section P. Roller pair 108 consists of two non-powered, spaced rollers 108a and 108b. Roller pair 110 consists of a pair of spaced rollers 110a and 110b which are aligned with rollers 108a and 108b, respectively. Rollers 110a and 110b are mounted on a shaft 112, one end of which carries a pulley 114 mounted thereon. Pulley 114 is, in turn, connected to a pulley 116 by a belt 118. Pulley 116 is driven by a stepping motor (not shown) situated within the printer module D.

The stepping motor will move the ticket step-wise through print means D which is a module including a specially designed printer for printing bar codes and text and a ribbon cassette (not shown). After the ticket passes between the print head and a platen 111 mounted to the top of the printer module D, it passes into output means E.

Printer means D includes a specially designed shuttle printer which is disclosed in detail in U.S. Pat. No. 4,534,287, entitled "Improved Dot Matrix Print Head" and issued Aug. 13, 1985, in the name of Robert A. Meloni. The reader is referred to that patent for a full description of the shuttle portion of the printer.

In general, the printer includes a plurality of hammer actuators which are mounted on a support. Instead of moving the entire massive support to traverse the ticket for each print line, only a low inertia member, which positions the impact ends of the print wires, is moved. The internal structure of the member facilitates minor curvature of the print wires as the member moves. The member is rapidly reciprocated relative to the support, but "dwells" for a short time at each extreme to permit the motor to index the ticket relative to the print head. Enhanced graphic capability is possible with such a printer because each print wire can print a plurality of dots for each print line.

After being printed, the ticket is moved until the leading edge thereof is engaged by an output hopper selection element 120 which serves to guide the advancing ticket into a selected one of two output hoppers 122 and 124. Element 120 is pivotally mounted on a shaft 126. The position of element 120 relative to shaft 126 is determined by a solenoid 128. Element 120 is movable by solenoid 128 between an upper and a lower position. When element 120 is in the lower position, the advancing edge of the ticket will be guided by the upper surface thereof between a powered roller 130 and a floating gravity plate 132, mounted on a shaft 134, into hopper 122. On the other hand, when element 120 is in the upper position, the lower edge thereof will guide the advancing ticket between a powered roller 136 and a floating gravity plate 138, mounted on shaft 126, into output hopper 124.

Rollers 130 and 136 are mounted on shafts which extend beyond plate 34 and which carry pulleys 139 and 140, respectively. Pulleys 139 and 140 are connected by a belt 142. The shaft which carries pulley 139 also carries a pinion gear 144 which is engaged by a relatively large gear wheel 146 mounted on a shaft 148 extending from plate 34.

The toothed edge of wheel 146 is frictionally engaged by a roller 150 made of resilient material. Roller 150 is mounted on the opposite end of the same shaft 112 as roller 110 and is driven, via belt 118, by the stepping motor in the printer module D.

Figure 3:
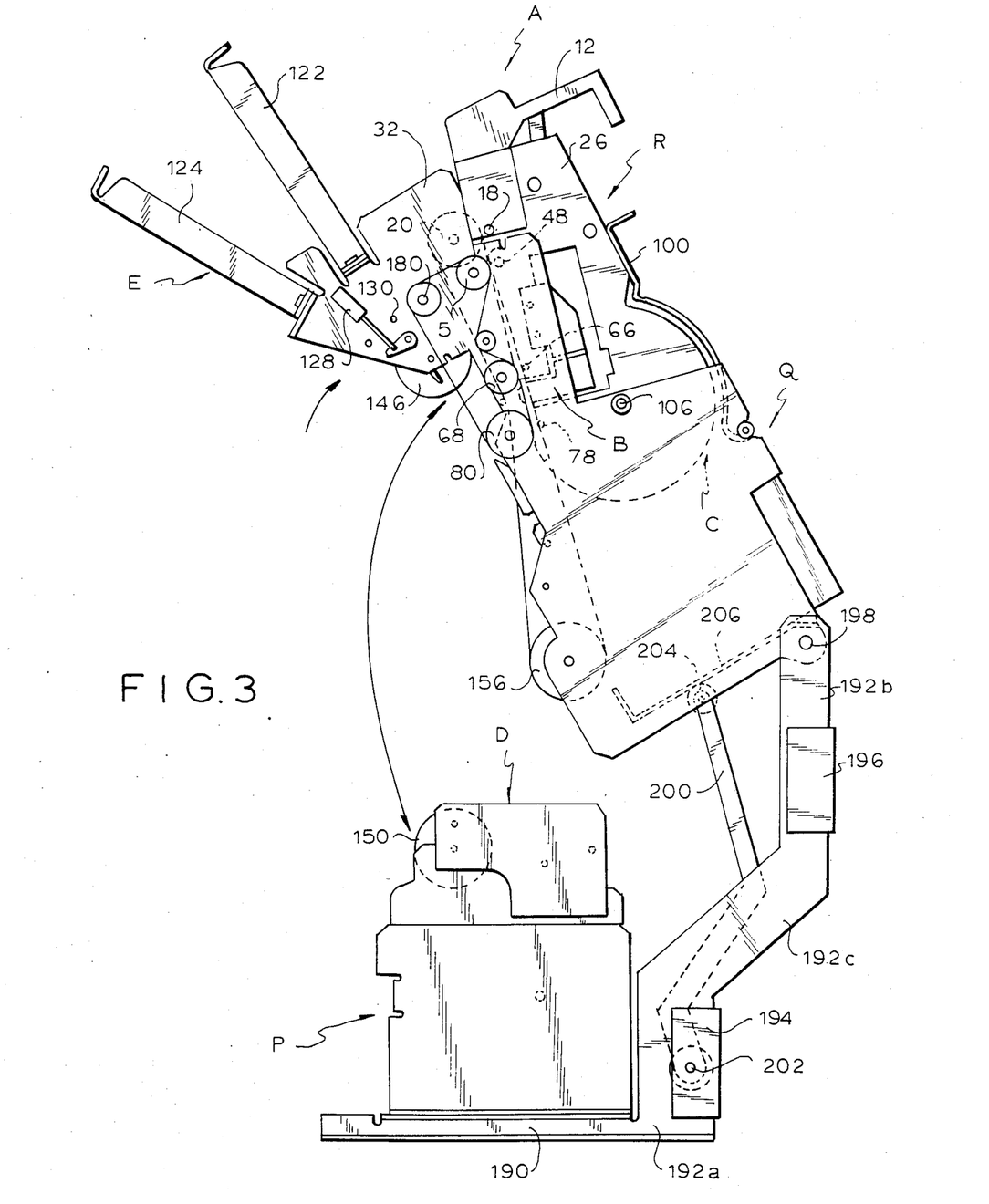
FIG. 3 is a side plan view of the document processing apparatus of the present invention showing the reader and transport frame sections pivoted with respect to the printer frame section.
Figure 4:
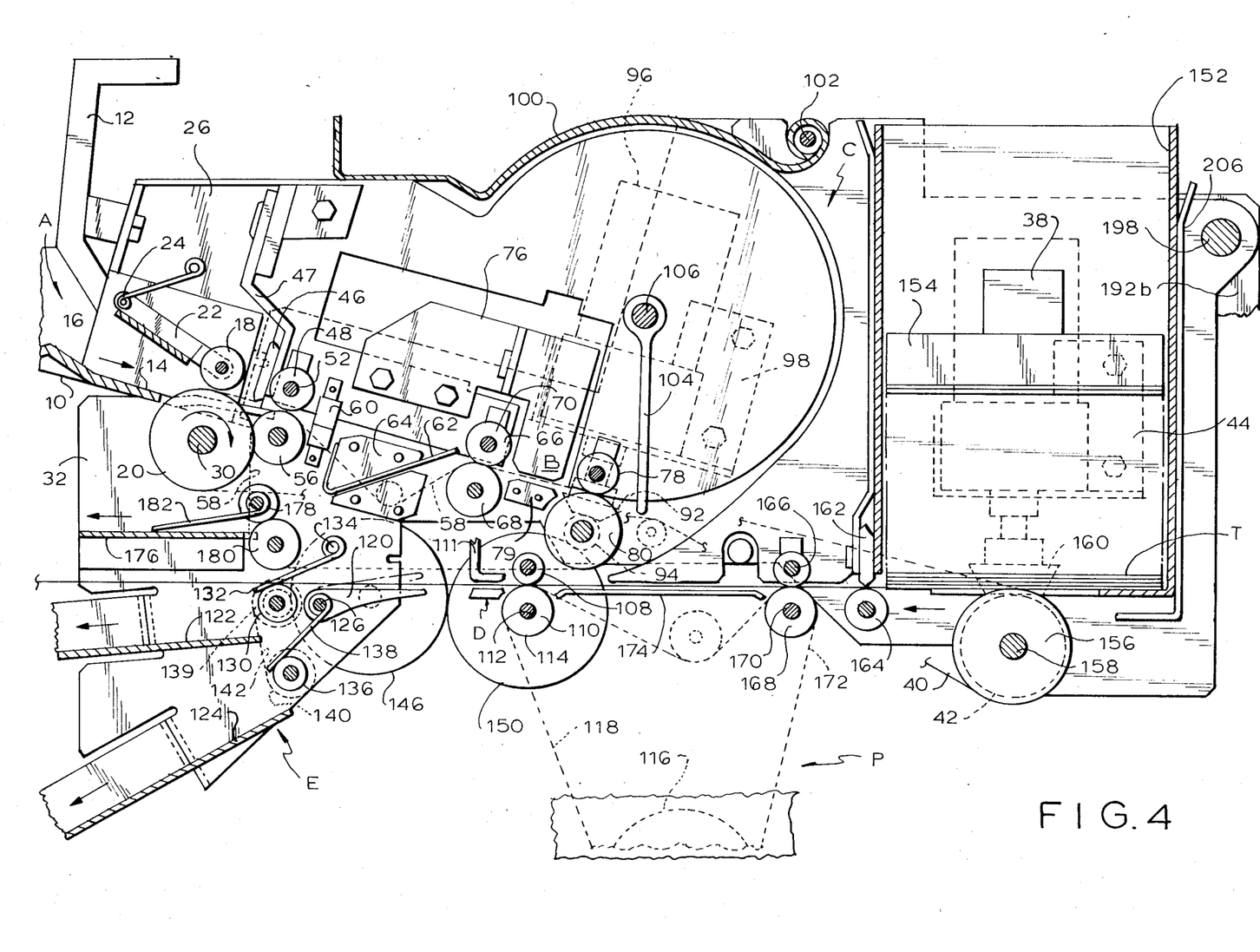
FIG. 4 is a side plan view of a portion of the document processing apparatus shown in FIG. 1, enlarged to show additional detail.

As seen in FIG. 3, when the transport frame section Q is pivoted to its operative position, wheel 146 will bear against roller 150 due to the arc of movement of wheel 146. This will cause roller 150 to deform slightly, insuring a positive drive action.

Blank document dispensing means F is mounted on the transport frame section Q between plates 32 and 34 at the extreme righthand end thereof (as seen in the figures) and serves to feed blank tickets into the second transport path. Blank document dispensing means F includes a top loading blank document magazine 152 which can be reloaded from the top of the apparatus without pivoting the frames or turning off the power.

Magazine 152 can accept a stack of up to 500 documents, each 0.007 inch thick. A weight 154 is provided to be situated on top of the stack in magazine 152 and functions to press the bottommost document in the stack against a powered scrub roller 156 centrally located on a shaft 158 extending between plates 32 and 34 of the transport frame section Q. One end of shaft 158 extends beyond the exterior of plate 34 and carries a pulley 42 on the end thereof. Pulley 42 is connected to the output shaft of motor 38 by a bevel gear 160. Thus, motor 38 drives the blank document scrub roller 156, as well as the input scrub roller 20, via belt 40.

When scrub roller 156 is rotated, the bottommost ticket in magazine 152 is removed from the blank document stack and moved between a gate 162 and an idler roller 164 to insure only a single ticket at a time is moved into the second transport path. The ticket moves along the second transport path until the edge thereof is situated between roller pairs 166 and 168. Roller pairs 166 and 168 each comprise a pair of spaced rollers 166a, 166b and 168a, 168b. These roller pairs are located on the transport frame section Q and the printer frame section P, respectively. Rollers 166 are mounted on a downwardly spring loaded shaft. Rollers 168a and 168b are mounted on a shaft 170, one end of which carries a pulley 172. Pulley 172 is driven by the stepping motor via belt 118.

The ticket moves above guide plate 174, between rollers 108 and 110 and then is stepped between platen 111 and printer D, where the necessary bar code and text are printed thereon. The ticket then passes into the appropriate output hopper 122 or 124.

Aside from hoppers 122 and 124, output means E includes a reject hopper 176, into which rejected tickets are guided by spring element 62. If a ticket partially received within retaining section C is unacceptable, it is driven between rollers 66 and 68 and the leading edge thereof is guided by the lower surface of element 62 toward reject hopper 176. Element 62 defines a portion of the reject transport path. After passing beneath element 62, the leading edge of the rejected ticket is engaged between roller pairs 178 and 180. Roller pairs 178 and 180 each consists of two spaced rollers 178a, 178b and 180a, 180b. Rollers 178a and 178b are located on a shaft which carries a floating gravity plate 182 which helps guide the ticket into hopper 176. The shaft upon which rollers 180a and 180b are mounted extends beyond plate 32 and carries a pulley which is driven by belt 58, such that the rotation thereof is synchronized with that of the other transport rollers 50, 68, and 80.

Figure 1:
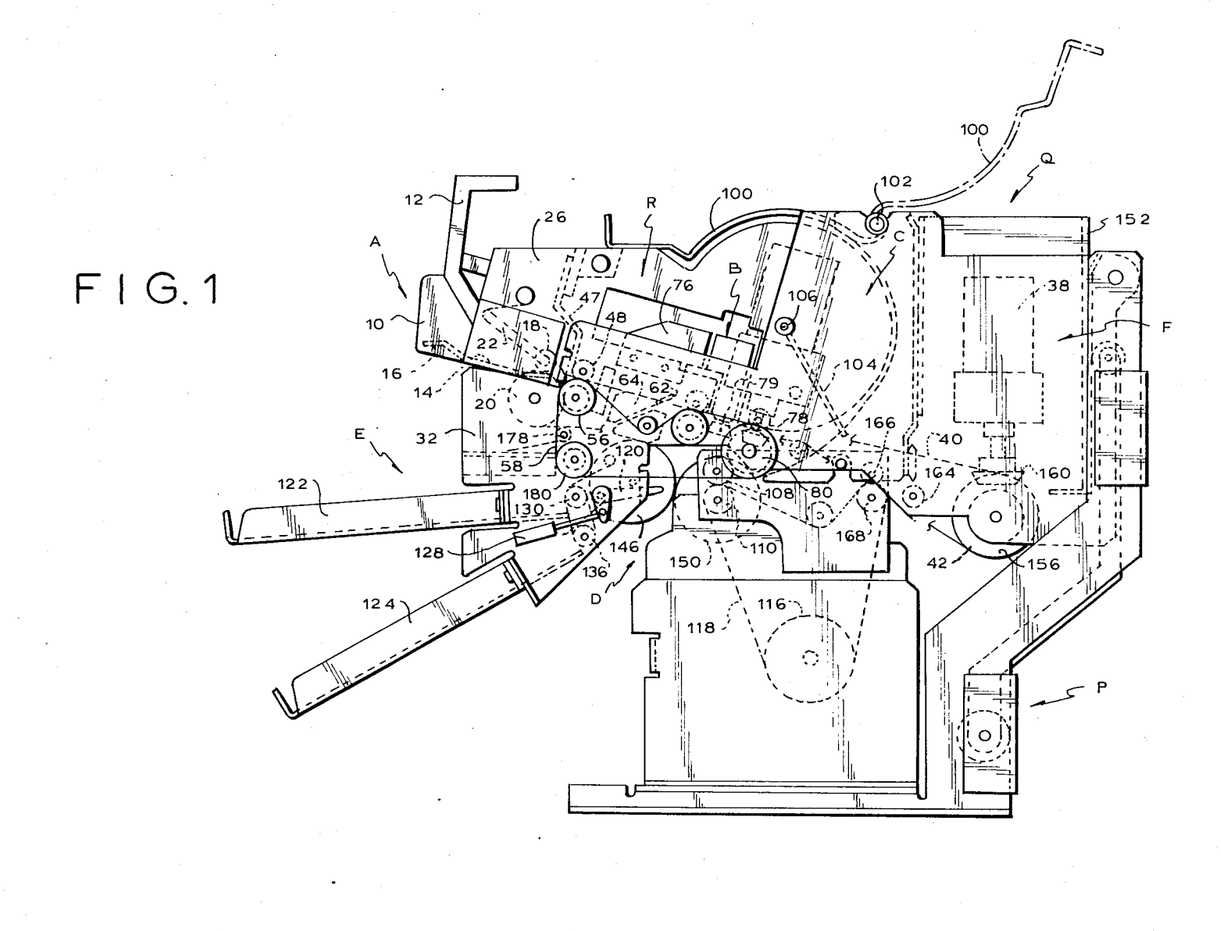
FIG. 1 is a side plan view of the document processing apparatus of the present invention.
Figure 2:
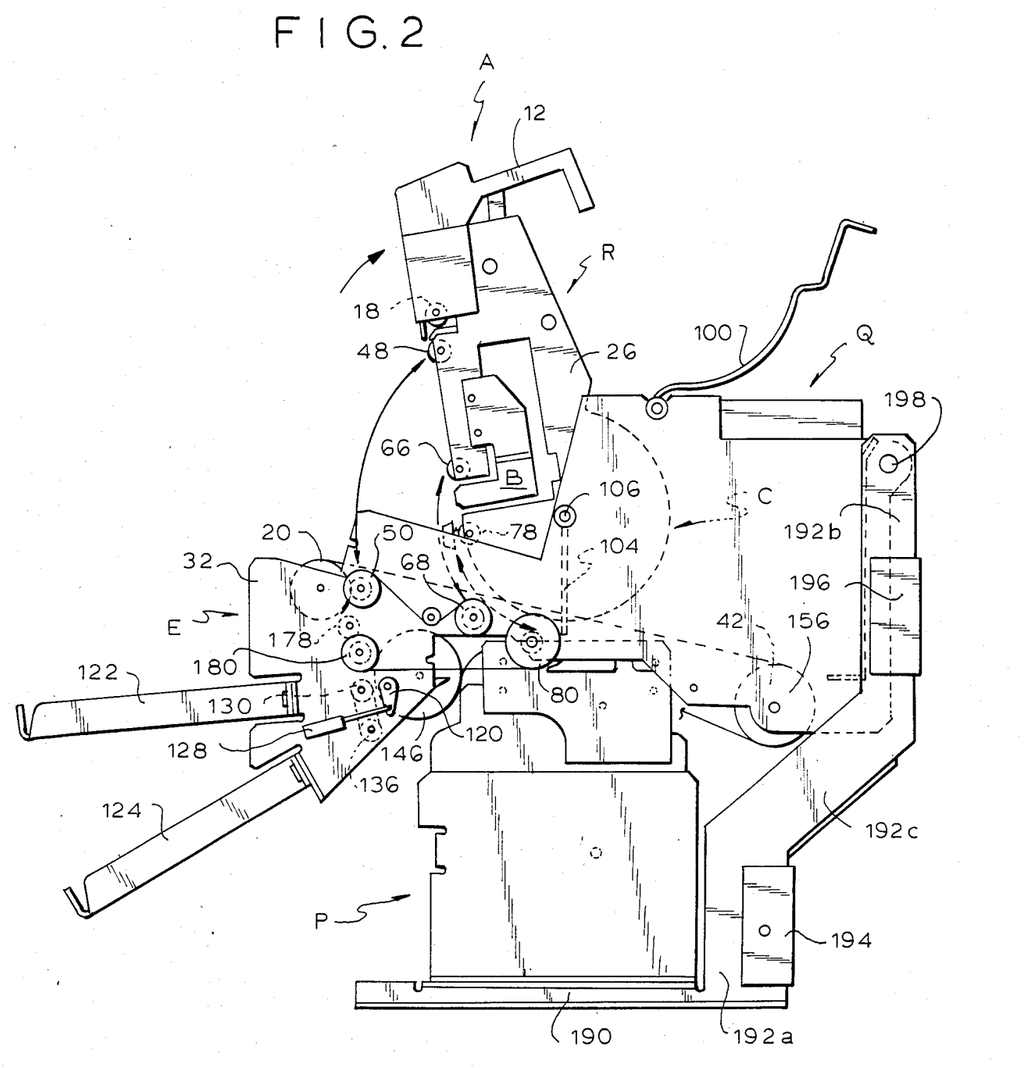
FIG. 2 is a side plan view of the document processing apparatus of the present invention showing the reader frame section pivoted with respect to the transport frame section.

Reader frame section R is pivotally mounted on transport frame section Q and, more particularly, on shaft 106 which extends between plates 26, 28 and plates 32, 34. As best seen in FIG. 2, reader frame section R can be pivoted relative to transport frame section Q about shaft 106 to provide access to read means B and the first transport path defined by rollers 18, 48, 66, and 78 on the reader frame section R, and rollers 20, 50, 68, and 80 on transport frame section Q.

Printer frame section P consists of the printer module D and a support frame. The support frame includes a base portion 190 upon which print module D is mounted and an upstanding portion 192 to which transport frame section Q is pivotally mounted. Portion 192 includes a lower vertical section 192a, an upper vertical section 192b, and an inclined intermediate section 192c. Portion 192 consists of a pair of spaced, parallel walls and a pair of "U"-shaped connecting brackets 194, 196 mounted on sections 192a and 192b, respectively, to provide additional structural rigidity.

Near the top of section 192b, a shaft 198 extends between the parallel walls of portion 192. Plates 32 and 34 of the transport frame section Q are also mounted on shaft 198, such that the transport frame section Q is pivotally mounted to portion 192. As best seen in FIG. 3, transport frame section Q (and reader frame section R) can be pivoted with respect to the printer frame section P to permit access to the printer module D and to the bottom of transport frame section Q for replacement or maintenance or clearing of jams.

In order to retain transport frame section Q in the open position, as shown in FIG. 3, an arm 200, which has a shape similar to portion 192, is mounted between the parallel walls of portion 192. More particularly, the lower end of arm 200 is rotatably mounted on a torque shaft 202 within section 192a. The upper end of arm 200 carries a roller 204 which abuts the rear wall 206 of the enclosure within which the blank document magazine 152 is located. Shaft 202 urges arm 200 towards module D, such that as the transport frame section Q is pivoted relative to portion 192, roller 204 on the upper end of arm 200 will move along the surface of wall 206 to the position shown in FIG. 3. In this position, arm 200 will maintain transport frame section Q in the pivoted position while repair or maintenance operations are being performed. When transport frame section Q is to be closed, arm 200 is moved towards portion 192, permitting transport frame section Q to return to its operative position.

Figure 7:
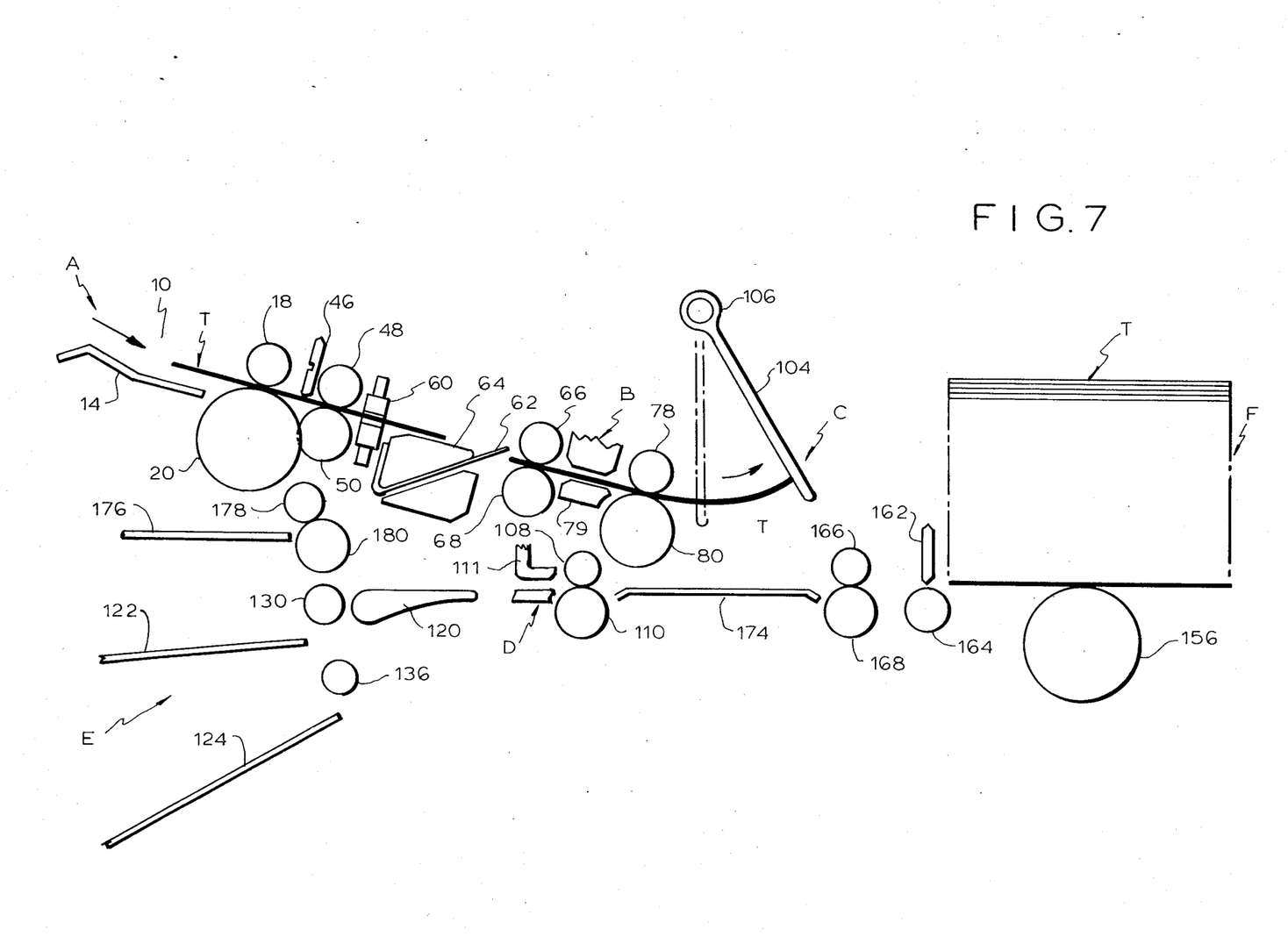
FIG. 7 is a semi-schematic diagram of the document processing apparatus of the present invention illustrating the movement of a document along the first transport path.
Figure 8:
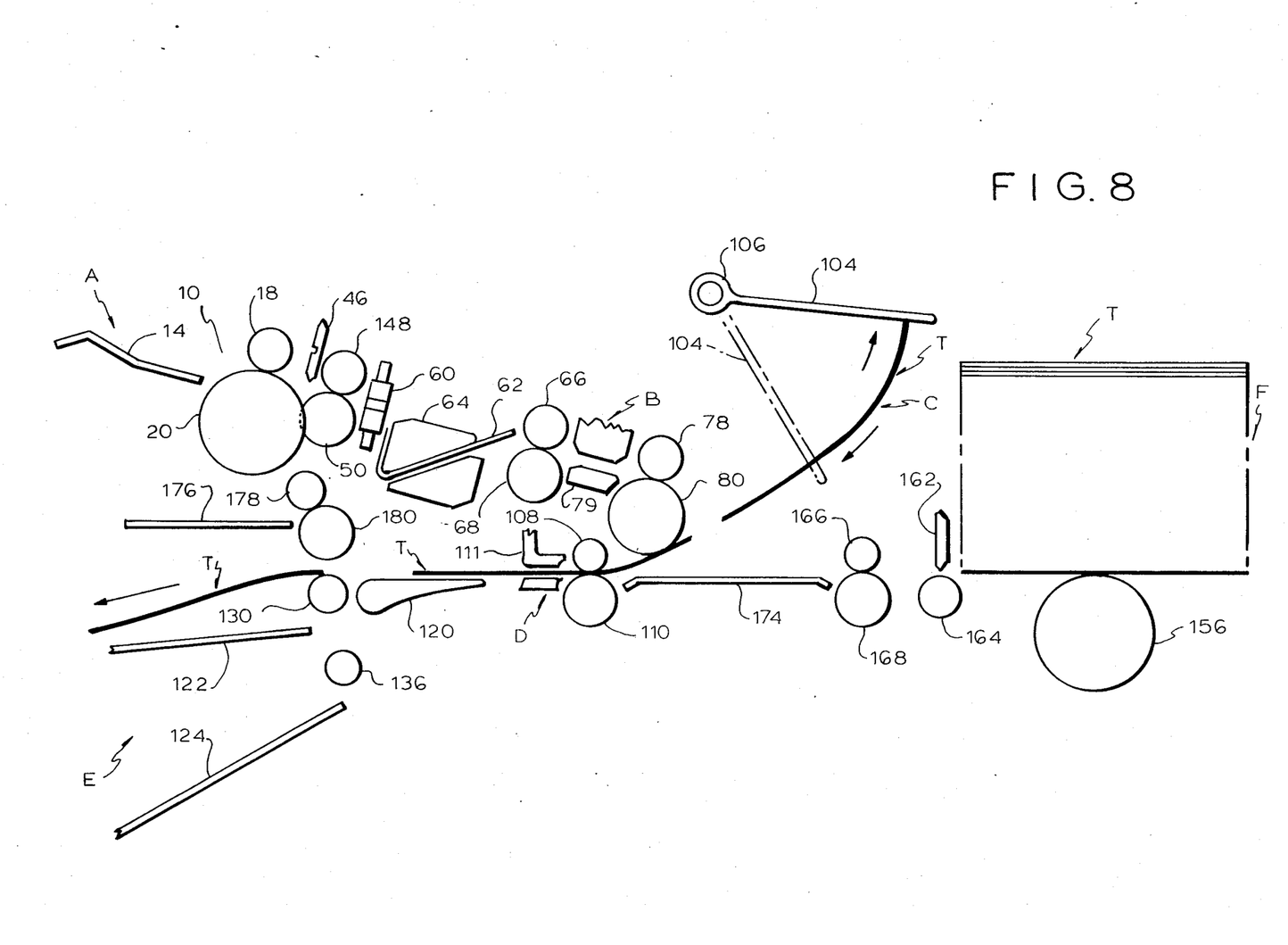
FIG. 8 is a semi-schematic diagram of the document processing apparatus of the present invention illustrating the movement of a document along the second transport path.

FIGS. 7-10 schematically illustrate the operation of the present invention. As shown in FIG. 7, a ticket T is first placed into the ticket receiving portion 10. The ticket may be one of two different types. The ticket may have been previously issued by a similar machine and have imprinted thereon a bar code and text which evidence a wager made at a prior time. That ticket is now being presented for cashing. Alternatively, the ticket may have a plurality of blank spaces which have been marked by the user to indicate a bet which he/she wishes to place.

Regardless of the type of ticket, the ticket passes between roller 18 and scrub roller 20 and through gate 46. These elements cooperate to insure that only a single ticket at a time passes to rollers 48 and 50. Roller 50 is driven at a higher speed than scrub roller 20 such that the ticket is pulled through rollers 18 and 20—an operation which is possible because scrub roller 20 is operably connected to pulley 36 through an overrunning clutch 37. The leading edge of the ticket is then advanced over spring element 62 and between rollers 66 and 88, past bar code reader 79 and mark sense reader B, between rollers 78 and 80, and partially into retaining means C. As the ticket enters means C, pivot arm 124 is moved from its initial position (shown in phantom in FIG. 7) to its intermediate position (shown in solid in FIG. 7).

The ticket is retained in the "hold" position until a decision is made as to whether the information read by the reader B is acceptable. If the bar code reader detects a bar code which represents a wager which has been won, the operator is advised to pay the ticket holder. The ticket is then driven completely into retaining means C. If the information from the mark sense reader indicates that the filled-in blanks on the ticket represent an acceptable bet, again, the ticket will be moved by rollers 78 and 80 completely into retaining means C.

Figure 9:
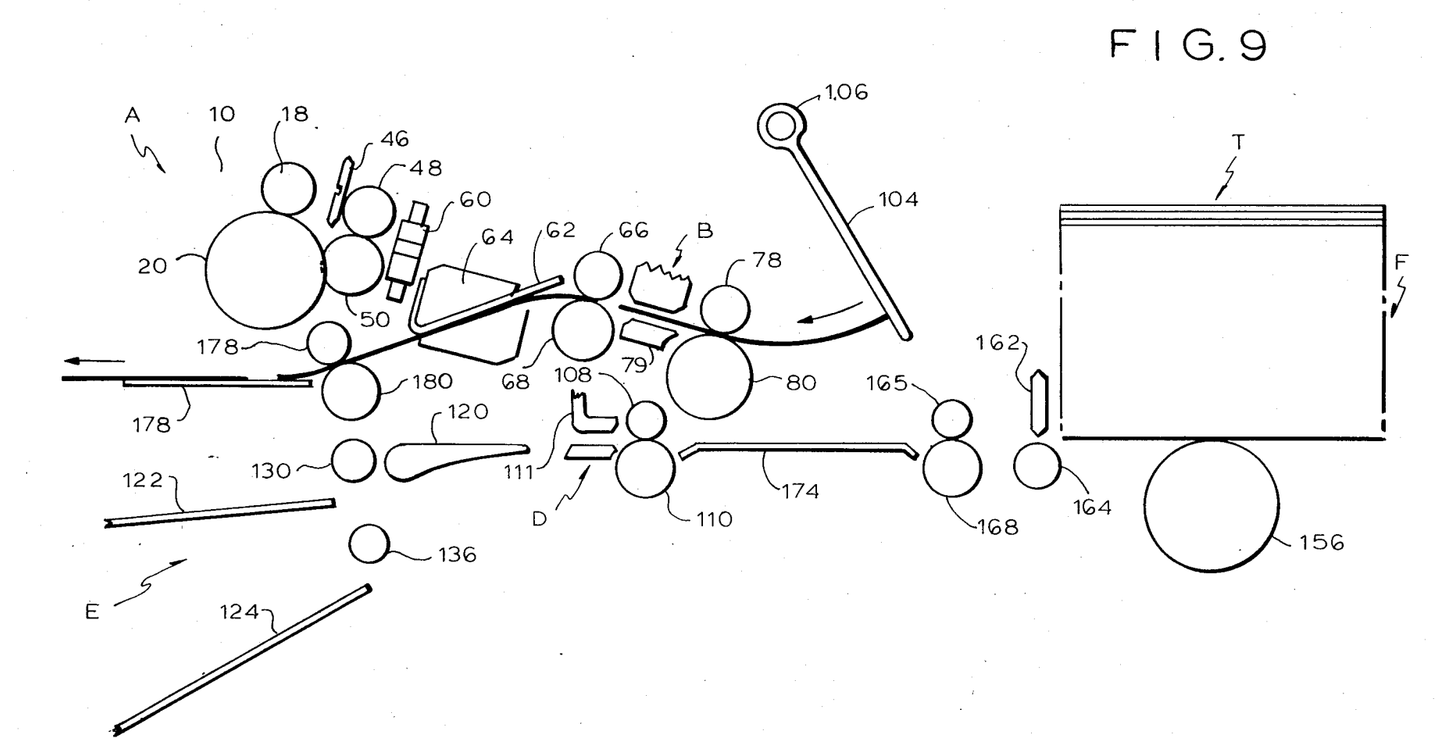
FIG. 9 is a semi-schematic diagram of the document processing apparatus of the present invention illustrating the movement of a document along the reject transport path.

However, if the bar code indicates a wager which was not won or the mark sense reader indicates an unacceptable bet, the direction of rotation of roller 80 is reversed (see FIG. 9). With the assistance of arm 104, which urges the ticket towards rollers 66 and 68, the ticket is driven in the reverse direction back along the first transport path until the leading edge thereof engages spring element 62.

The leading edge of the ticket passes beneath element 62 until the edge thereof is received between rollers 178 and 180. The rejected ticket is then guided between rollers 178 and 180 into reject output hopper 176.

If, on the other hand, the ticket is accepted, rollers 78 and 80 will move the ticket completely within retaining means C (see FIG. 8), such that arm 104 moves from its intermediate position (shown in phantom in FIG. 8) to its final position (shown in solid in FIG. 8), in a counterclockwise direction. Pivot arm 104 will then tend to move the ticket into the second transport path (because of the force of gravity aided by a torsion spring) and, in particular, below roller 80 and between rollers 108 and 110 such that it is moved stepwise between platen 111 and printer D. As it moves past printer D, the ticket is cancelled if the winning bet has been paid or a bar code representing the accepted bet (in accordance with the information marked on the ticket by the bettor) and text representing a user-readable confirmation of the bet are printed thereon. The ticket then travels over the upper surface of hopper selection element 120, which is in its lower position, over roller 130 and into output hopper 122.

Figure 10:
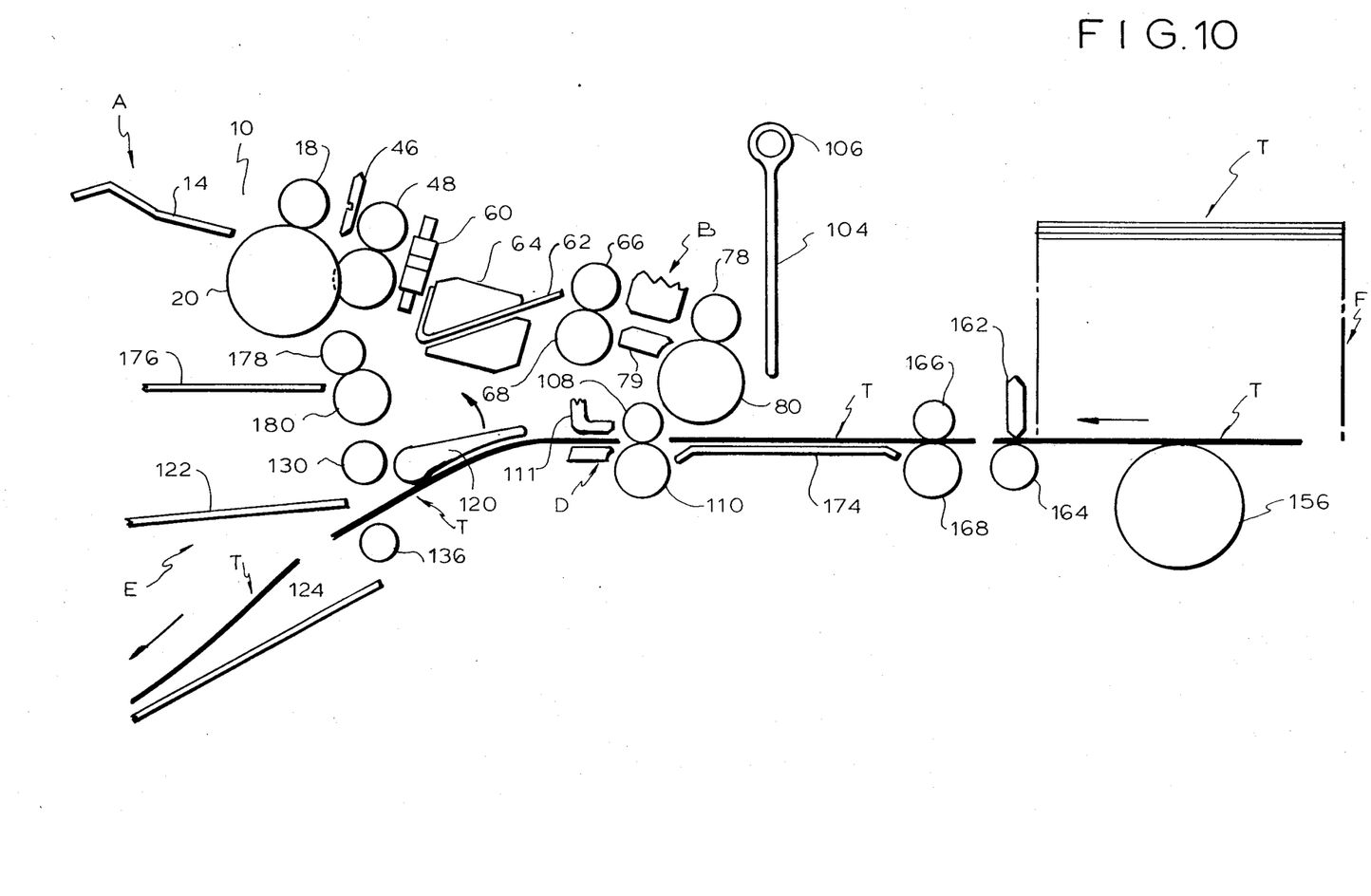
FIG. 10 is a semi-schematic diagram of the document processing apparatus of the present invention, illustrating the movement of a document from the blank document dispensing means along the second transport path.

If the apparatus is functioning as a ticket issuing machine, a blank ticket will be dispensed from a blank ticket dispensing means F into the second transport path such that it can be imprinted with the necessary bar code and text information and, thereafter, fed to output hopper 124 (see FIG. 10). In this case, the information which is imprinted on the ticket, instead of being read from the ticket, is fed to the apparatus by an operator who will collect the bettor's money and enter the necessary information into the apparatus by means of a keyboard entry system or the like (not shown).

To dispense a blank ticket, motor 38 drives scrub roller 156, which is in contact with the stack of blank documents situated in blank document dispensing means F, and causes the bottom ticket in the stack to be moved between gate 162 and roller 164. The ticket then moves between rollers 166 and 168, over guide 174 and between rollers 108 and 110, until it is situated between platen 111 and printer D. As the ticket moves past the print head of printer D, the bar code and text information previously entered into the apparatus by the operator is imprinted thereon. The ticket is then guided into output hopper 124 by selection element 120, which is in its upper position, and by roller 136.

As will now be readily appreciated, the present invention relates to a document processing apparatus which performs a variety of functions. The apparatus itself, however, is highly compact. Apparatus of this relatively small size which has such a large number of different components and transport paths would normally be extremely difficult to maintain. However, as noted above, the apparatus of the present invention is designed for use at a multitude of locations and to be operated by relatively unskilled personnel who must be able to clear jams and do routine maintenance.

In order to permit same, the apparatus of the present invention is constructed in a unique manner. All of the components are situated on one of three frame sections which can be moved with respect to each other to expose either the first transport path or the second transport path and each of the major components along these paths.

While only a single preferred embodiment of the present invention has been disclosed herein for purposes of illustration, it is obvious that many modifications and variations could be made thereto. It is intended to cover all of these variations and modifications which fall within the scope of the present invention, as defined by the following claims:

We claim:

1. Document processing apparatus comprising input means, reader means, and retaining means arranged along a first path, first means for transporting a document along said first path between said input means and said retaining means, printer means and output means arranged along a second path, second means for transporting a document along said second path between said retaining means and said output means, first and second frame sections, and first means for operably connecting said first frame section and said second frame section for relative movement therebetween to provide access to said first path.

2. The apparatus of claim 1, further comprising a third frame section and second means for operably connecting said second frame section and said third frame section for relative movement therebetween to provide access to said second path.

3. The apparatus of claim 1, wherein said input means and said reader means are mounted on said first frame section.

4. The apparatus of claim 2, wherein said printer means is mounted in said third frame section.

5. The apparatus of claim 1, wherein said output means is located on said second frame section.

6. The apparatus of claim 2, wherein said first frame section is movable with said second frame section, as a unit, relative to said third frame section.

7. The apparatus of claim 1, wherein said second frame section is partially defined by a pair of spaced frame plates.

8. The apparatus of claim 7, wherein said first frame section is mounted at least partially between said frame plates.

9. The apparatus of claim 1, wherein said first frame section and said second frame section define said retaining means.

10. The apparatus of claim 1, wherein said retaining means is defined between correspondingly curved spaced portions of said first and second frame sections.

11. The apparatus of claim 1, further comprising a cover element mounted on said second frame section having a curved portion spaced from said first frame section and partially defining said retaining means.

12. The apparatus of claim 1, wherein said movement of said first frame section relative to said second frame section is substantially pivotal.

13. The apparatus of claim 2, wherein said movement of said second frame section relative to said third frame section is substantially pivotal.

14. The apparatus of claim 1, wherein said second frame section is movable with respect to said third frame section to an open position and further comprising means for maintaining said second frame section in said open position.

15. The apparatus of claim 1, wherein said first transport means comprises bidirectionally driven rollers.

16. The apparatus of claim 1, wherein said reader and printer means operate on different sides of the document.

17. The apparatus of claim 1, further comprising blank document dispensing means.

18. The apparatus of claim 17, wherein said blank document dispensing means comprises means for feeding blank documents from said dispensing means into said second path.

19. The apparatus of claim 17, wherein said dispensing means is mounted on said second frame section.

20. The apparatus of claim 17, wherein said dispensing means comprises blank document retaining means and access to said blank document retaining means is provided from the top of said second frame section.

21. The apparatus of claim 1, wherein said reader means comprises means for reading a bar code and a mark sense reader.

22. The apparatus of claim 1, wherein said printer means comprises a bar code printer.

23. The apparatus of claim 22, wherein said printer means comprises an internally driven printer module.

24. The apparatus of claim 1, further comprising a document transport path interconnecting said first path and said output means.

25. The apparatus of claim 24, wherein said interconnecting path, interconnects said first path at a point between said reader means and said input means with said output means.

26. The apparatus of claim 1, further comprising means normally situated in a first position to be engaged by a document as it is moved into said retaining means and adapted to be moved by the document from said first position to a second position, said engaged means, when in said second position, tending to move the document out of said retaining means.

27. The apparatus of claim 1, wherein said first transport means comprises means for moving a document between said reader means and said retaining means and means for controlling the actuation and direction of said moving means.

28. The apparatus of claim 27, wherein control means causes said moving means to move the document partially into said retaining means and, thereafter, either out of said retaining means or completely into said retaining means.

29. The apparatus of claim 28, further comprising means normally situated in a first position to be engaged by a document as it is moved into said retaining means and adapted to be moved by the document from said first position to a second position, said engaged means, when in said second position, tending to move the document out of said retaining means.

30. The apparatus of claim 29, wherein said engaged means tends to move the document towards said second path if said document is situated completely within said retaining means.

31. The apparatus of claim 1, wherein said output means comprises first and second output hoppers and means for directing a document from said second path into a selected one of said first and second output hoppers.

32. The apparatus of claim 1, wherein said printer means comprises a bar code printer and a text printer.

33. Apparatus for processing a document of the type having either user markable indicia located on one side of the document, or machine-readable indicia and user-readable indicia located on the other side of the document comprising a document transport path having a first section and a second section, means for reading the user markable indicia and the machine-readable indicia located proximate said first section, operable on one side of said document, and means for printing said user-readable indicia and said machine-readable indicia, located proximate said second section, operable on the other side of the document.

34. The apparatus of claim 33, further comprising means for dispensing a blank document to said second section.

35. The apparatus of claim 33, further comprising means for transporting a document along said first section in substantially opposite directions.

36. The apparatus of claim 33, wherein the end of said first section is operably connected to the beginning of said second section.

37. Document processing apparatus comprising first processing means, second processing means, document direction reversing means, output means, first means for transporting a document in a first direction along a first transport path proximate said first processing means to said direction reversing means, second means for transporting a document in a second direction along said second transport path from said direction reversing means, proximate said second processing means, to said output means, and means for transporting the document in substantially said second direction along a third transport path from said direction reversing means to said output means, said third transport path bypassing said second processing means.

38. The apparatus of claim 37, further comprising means for dispensing blank documents into said second transport path.

39. The apparatus of claim 37, wherein said output means comprises first and second output hoppers and means for selecting one of said output hoppers for guiding a document into said selected hopper.

40. The apparatus of claim 37, wherein said first processing means comprises means for controlling said first and said second transport means to move a document through a selected one of said transport paths.

41. The apparatus of claim 37, wherein said first processing means comprises document reading means.

42. The apparatus of claim 37, wherein said second processing means comprises document print means.

* * * * *